(No Model.)

J. L. TAYLOR.
PIPE OR NUT WRENCH.

No. 464,401.   Patented Dec. 1, 1891.

Witnesses
W. R. Edelen.
Arthur E. Dowell

Inventor
James L. Taylor
by
J. S. Alexander atty

UNITED STATES PATENT OFFICE.

JAMES L. TAYLOR, OF MEMPHIS, TENNESSEE.

PIPE OR NUT WRENCH.

SPECIFICATION forming part of Letters Patent No. 464,401, dated December 1, 1891.

Application filed August 13, 1891. Serial No. 402,503. (No model.)

*To all whom it may concern:*

Be it known that I, JAMES L. TAYLOR, of Memphis, in the county of Shelby and State of Tennessee, have invented certain new and useful Improvements in Pipe and Nut Wrenches; and I do hereby declare that the following is a full, clear, and exact description thereof, reference being had to the accompanying drawings, and to the letters of reference marked thereon, which form part of this specification, in which—

Figure 1:
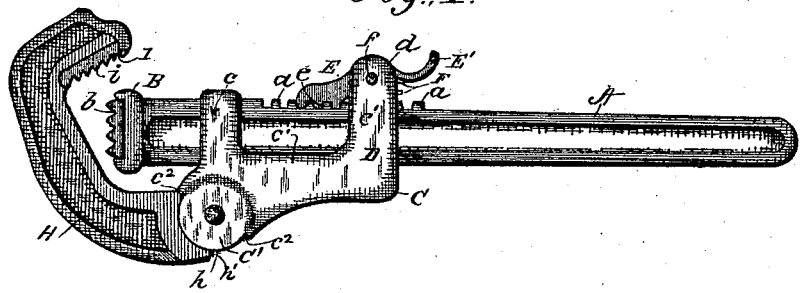
Figure 2:
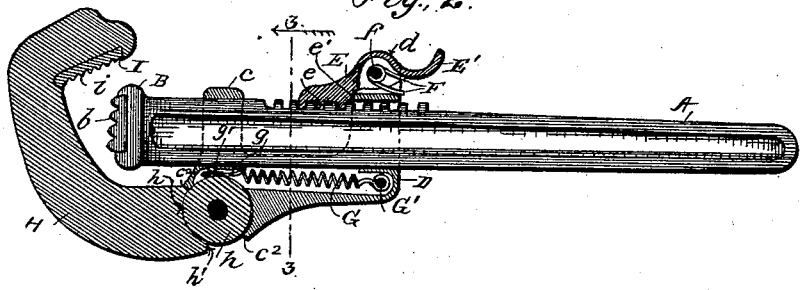
Figure 3:
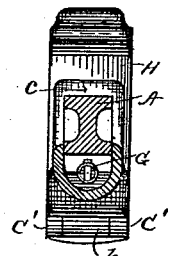
Figure 4:
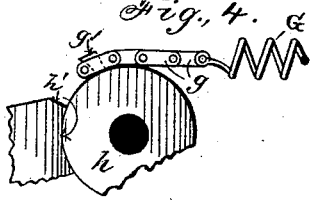

Figure 1 is a side view of my improved pipe and nut wrench. Fig. 2 is a central longitudinal sectional view of the same. Fig. 3 is a transverse sectional view of the same on line 3 3, Fig. 2. Fig. 4 is an enlarged detail of links $g$, secured to shank $h$.

This invention is an improvement in pivoted sliding-jaw pipe and nut wrenches, and especially upon the wrench for which Letters Patent No. 434,847 were granted to me on the 19th day of August, 1890; and its objects are to provide an adjustable self-gripping pipe-wrench which can be readily manipulated by one hand; and it consists in the novel construction and combination of parts hereinafter described and claimed.

Referring to the drawings by letters, A designates the handle-stock—a straight slightly-tapered bar—having a head B on one end, which is transversely slotted or dovetailed to receive a removable or replaceable toothed biting-piece $b$ of steel or other hard metal. In rear of this head one edge of the bar is toothed, as at $a$, the teeth being preferably square in cross-section, as shown.

C designates an adjustable sleeve connected to and supported on handle A by means of loops D $c$ at its rear and front ends, respectively, so that it lies against the side of handle A, opposite teeth $a$, and can be moved longitudinally of the handle. A toothed dog E is pivoted between ears $d\ d$, rising from loop D, and its forward end has angular teeth $e$ on its under surface adapted to interlock with teeth $a$ on handle A, and thus lock the sleeve in position. The dog is also shouldered, as at $e'$, and when its teeth are in engagement with teeth $a$ said shoulder binds against the forward edge of the top of loop D, as shown, and thus makes direct contact between the dog and loop D, taking strain off the pin $f$, upon which the dog is pivoted. The rear end E' of dog E is upturned into a finger-piece, which can be pressed by the thumb of the operator, and when depressed the dog is thrown out of engagement with teeth $a$ and the sleeve can be slid up or down on the handle by bending or straightening the thumb. Dog E is chambered around pin $f$, and a coiled spring F is slipped on the pin with its ends bearing against the under surface of dog E and the top of loop D, and thus it serves to normally throw the teeth of dog E into contact with the teeth of handle A. The sleeve has side flanges $c'$ between loops D $c$, which partially embrace the handle and prevent lateral rocking of the sleeve and relieve the loops of lateral strain. The forward end of the sleeve drops downward and is formed with opposite ears C', between which is pivoted the shank $h$ of a movable jaw H. This shank is shouldered, as at $h'\ h'$, and ears C' are shouldered, as at $c^2\ c^2$, so that the swing of the jaw is properly limited. A coiled spring G is placed in sleeve C, one end thereof being fastened to the rear end of the sleeve, as at G', and its front end being connected by chain links $g$ to a stud $g'$ on the shank of jaw H, so that the jaw is always drawn upward or turned inward toward loop $c$ of the sleeve. The spring and links are entirely concealed within and protected by sleeve C, and links $g$ ride over the rounded surface of shank $h$ as the jaw swings, preventing twisting of spring G, so that its efficiency is not impaired by improper strains. Jaw H is hook-shaped, as shown in the drawings, extending straight from the shank about a third of its length, then bending upwardly at an angle of about forty-five degrees for about another third of its length, and then bending inwardly at right angles to its intermediate portion. The inner face of the end of the jaw is recessed, as at I, for the reception of an insertible steel-toothed bit $i$, the teeth of which set opposite to those of bit $b$ when the parts are in proper position.

In operation the sleeve is adjusted so as to cause the wrench to properly bite or clamp a nut or pipe between bits $b$ and $i$. Then it is moved back and forth without disengaging it from the pipe or nut. At each backward movement of the handle spring-jaw H yields sufficiently to allow the bits to slip over the surface of the pipe or around the corners of the nut; but the spring causes the jaw to bite as soon as backward movement is stopped, and on the forward movements the bits grip the pipe or nut. The spring keeps the wrench close to its work until it is forcibly removed. The wrench can be left on the work, operated like a ratchet-wrench, and adjusted by one hand, and is also positive in operation. When gripping a pipe or nut, the strain on jaw H is transmitted through sleeve C and dog E to handle A, and the pull tends to throw jaw H toward head B, so that the greater the strain exerted to turn the pipe or nut the tighter will the wrench grip the same.

Having thus described my invention, I claim—

1. The combination, with the handle-bar having a head on its end and toothed on one edge, of the sleeve adjustably connected to said bar, the pivoted dog attached to said sleeve and engaging the teeth of the bar, and the curved jaw pivoted to the front end of said sleeve, and the spring concealed in said sleeve connected at its rear end to the sleeve and by its front end to the shank of the jaw, so as to throw the latter upward, substantially as specified.

2. In a wrench, the combination of the straight handle-bar having a bit on its front end and toothed on one edge, the sleeve adjustably connected to said bar by loops, and the dog pivoted on one loop and engaging the teeth of the bar and adapted to be operated by the thumb of the operator, with the curved hook having a shouldered shank pivoted between shouldered ears on the front end of the sleeve, and the spring concealed in said sleeve and connected at rear to the rear end of the sleeve and at front by links to the shank of the curved jaw and normally holding the said jaw in upright engaging position, substantially as specified.

3. The combination of the straight handle-bar having an enlarged slotted head on one end, a bit inserted therein and toothed on one edge near said head, and the sleeve having loops embracing said bar and suspending it thereon and side flanges to prevent it rocking on said bar, with the spring-controlled dog pivoted between ears on the rear loop of said sleeve and having angular teeth engaging the teeth of the bar, and a shoulder engaging the edge of the loop when the teeth are engaged, and the curved jaw having its shouldered shank pivoted between shouldered ears on the front end of the sleeve and its front end slotted for the reception of a removable bit, and the coiled spring inserted in said sleeve and connected to the rear end thereof and at its front end to links connected to the shank of the jaw, all substantially as set forth.

In testimony that I claim the foregoing as my own I affix my signature in presence of two witnesses.

JAMES L. TAYLOR.

Witnesses:
ARTHUR E. DOWELL,
JAMES R. MANSFIELD.